INVENTORS
Colin C. Ware
Richard F. Blake
Edward A. Demers

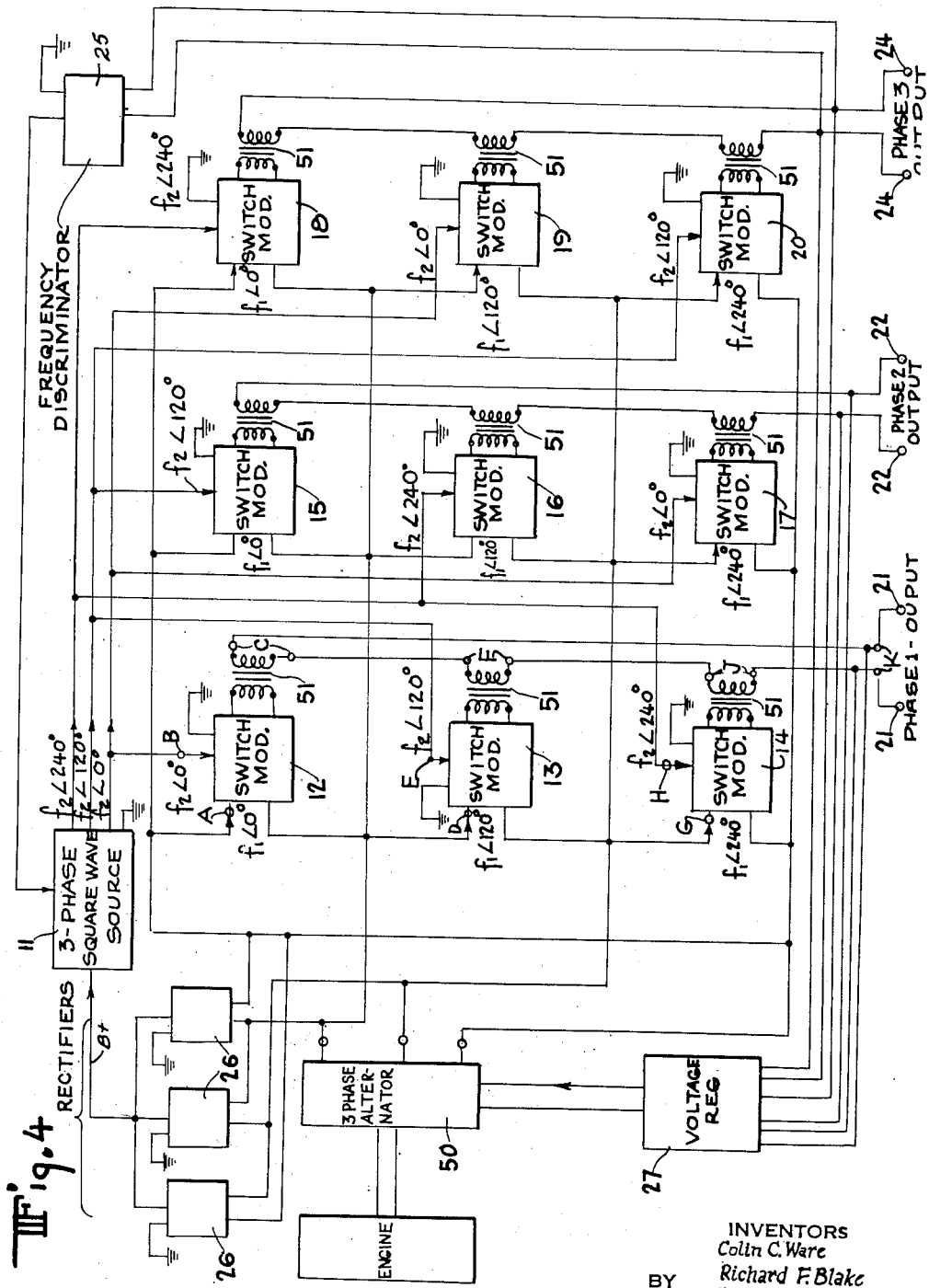

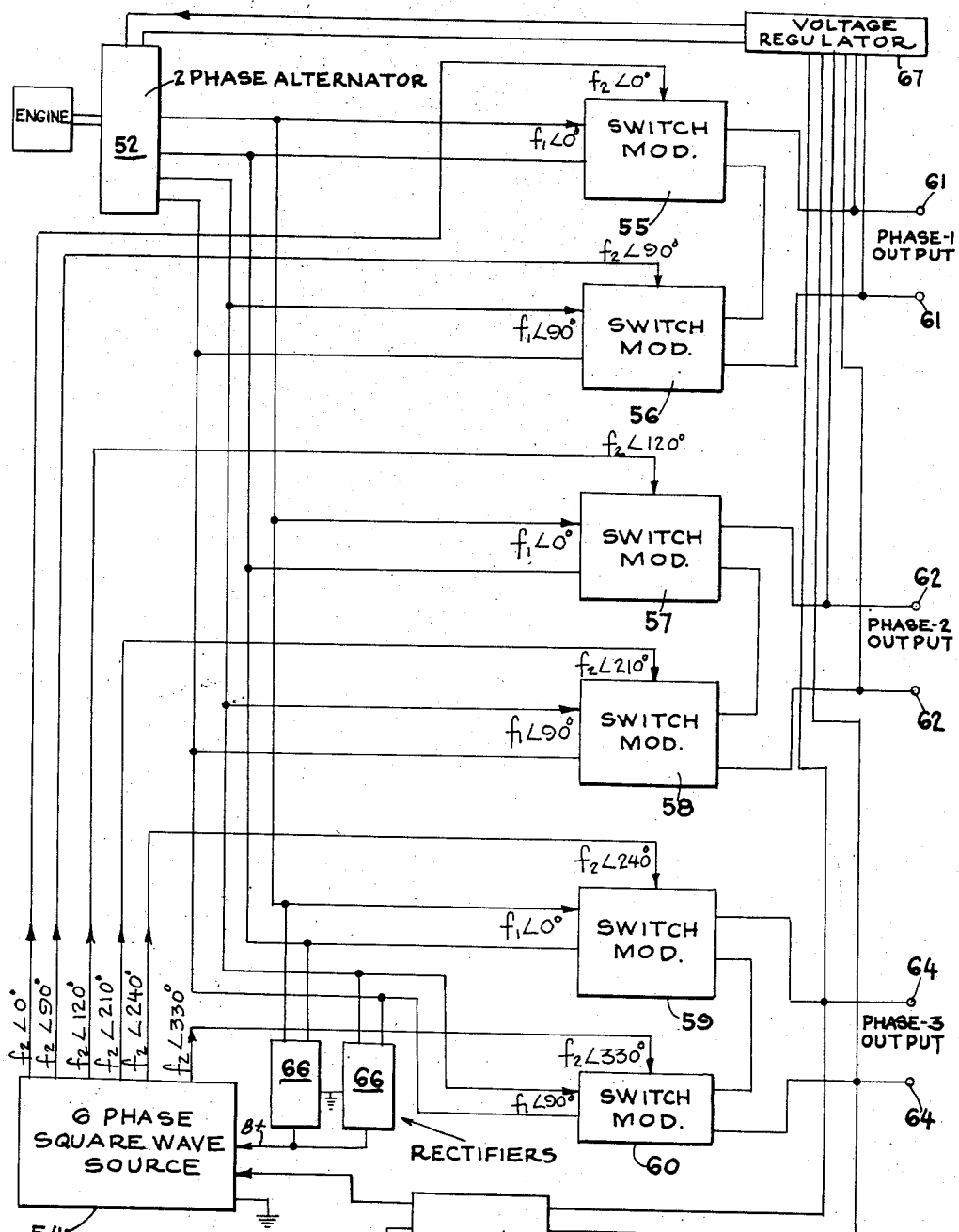

United States Patent Office 2,899,566
Patented Aug. 11, 1959

2,899,566

SYSTEM FOR SUPPLYING CONTROLLED FREQUENCY POWER

Colin C. Ware, Midland Park, Richard F. Blake, Mountain Lakes, and Edward A. Demers, Newark, N.J., assignors to Specialties Development Corporation, Belleville, N.J., a corporation of New Jersey Application September 5, 1958, Serial No. 759,281

16 Claims. (Cl. 307—73)

The present invention relates to power supply systems, and, more particularly, to power supply systems of the type including a secondary frequency source by means of which the frequency of the power supplied is controlled.

In many applications, there is a need for an efficient, reliable, economical, and light weight power supply which will provide a controlled frequency output, for example, in modern military aircraft, where it is essential that electrical power of constant frequency and voltage be supplied to precisely operate electronic equipment. Since it is essential that the weight of the electrical power supply system be kept to a minimum, it is common practice to use, as a source of electrical power, an alternating current generator driven by the aircraft's propulsive engine. The speed of this engine, however, is not constant throughout the various phases of flight (i.e. takeoff, cruise, top speed dash, and letdown). Therefore, if the generator is driven directly from the engine, the speed of rotation of the generator will vary with engine speed, and the output of the generator will vary in voltage and frequency.

Since a three phase electrical system requires less copper to transmit a given amount of power than a system having any other number of phases, it is desirable that the power supply have a three phase output in addition to constant frequency and voltage. One type of device currently used to provide three phase electrical energy at a constant frequency and voltage is a constant output speed transmission which is placed between the aircraft's engine and a three phase generator to maintain the speed of rotation of the generator constant. Devices of this type, however, have inherent disadvantages in that they are relatively heavy, complex, and expensive.

Other devices, which have been designed to provide three phase, constant frequency power, require additional electrical machinery and therefore are also relatively heavy and expensive.

It has been proposed that a lighter and more economical three phase constant frequency power supply may be provided by amplitude-modulating the output of each phase of a directly driven three phase generator with a signal having a constant frequency equal to the desired output frequency, rectifying the amplitude modulated output in a manner such that the polarity of every second half cycle is reversed, and filtering out the original generator frequency. In systems of this type, a good portion of the power available at the generator is prevented from appearing at the output due to the amplitude modulation and the rectification. It may be seen therefore, that for any desired power output of a system, the generator must be capable of producing substantially greater power. As a result, a heavier generator must be used with this type of system than with an uncontrolled system having the same output power.

Accordingly, an object of the present invention is to provide a power supply system in which the output of a polyphase power source is modified to provide a controlled frequency power output.

Another object is to provide a controlled output frequency power supply system in which substantially all of the power available at the output of a polyphase power source appears as usable power at the power supply output.

Another object is to provide a constant frequency power supply system including a variable frequency polyphase power source in which substantially all of the power available at the output of the power source appears as usable power at the power supply output.

Another object is to provide a highly efficient system for converting polyphase power at one frequency into power at a different frequency.

A further object is to provide a light weight system to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

Preferred embodiments of the invention have been chosen for purposes of illustration and description, and are shown in the accompanying drawings, forming a part of the specification, wherein:

Fig. 4 is a block diagram of a controlled frequency power supply system which is a modification of the system shown in Fig. 1.

Fig. 5 is a block diagram of another modified controlled frequency power supply system.

Figure 1:
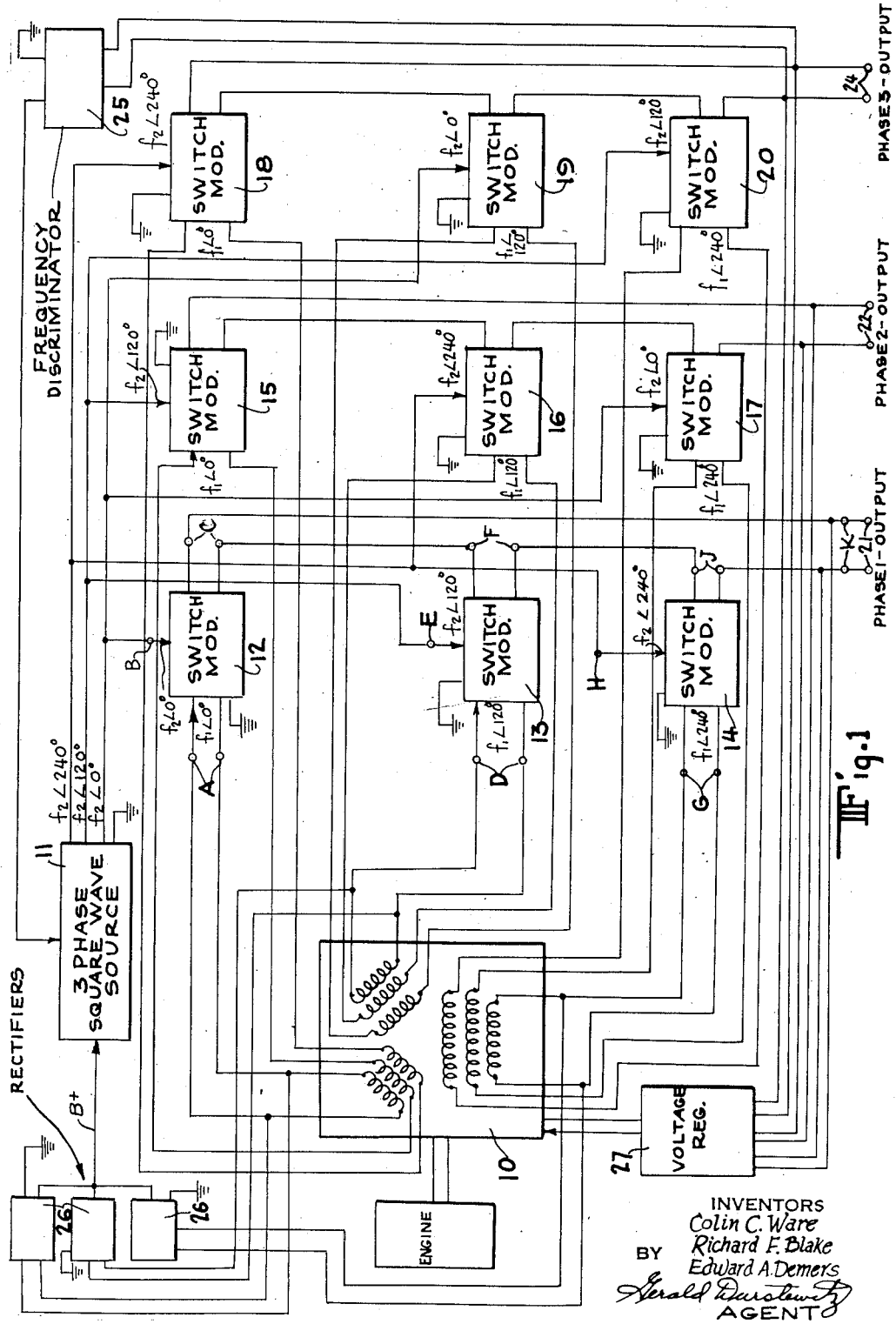
Fig. 1 is a block diagram of a controlled frequency power supply system in accordance with the present invention.

Referring to Fig. 1 of the drawings in detail, there is shown a system for supplying controlled frequency three phase power in accordance with the present invention which system generally comprises a three phase, eighteen wire alternator 10 directly driven by a variable speed engine, a square wave source 11 having a three phase output, and nine balanced switch modulators 12 to 20 each connected to one phase of the alternator and to one phase of the square wave source.

The alternator 10 has three armature windings for each of the phases thus providing three outputs for each phase. Three of the alternator windings, therefore, produce outputs which may be considered to have a 0 degree phase angle, three of the windings produce outputs which have a phase angle of 120 degrees with respect to the first three windings, and the remaining three windings produce outputs which have a phase angle of 240 degrees with respect to the first three windings.

Each of the modulators 12, 15 and 18 are connected to one of the 0 degree phase windings of the alternator, each of the modulators 13, 16 and 19 are connected to one of the 120 degree phase windings, and each of the modulators 14, 17 and 20 are connected to one of the 240 degree phase windings.

The square wave source 11 produces three wave trains of square wave pulses which are 120 degrees out of phase with each other and therefore may be considered to have phase angles of 0 degrees, 120 degrees and 240 degrees.

The modulators 12, 13 and 14 are connected respectively to the 0 degree phase, the 120 degree phase, and the 240 degree phase outputs of the source 11, while the modulators 15, 16 and 17 are connected to the 120 degree phase, the 240 degree phase, and the 0 degree phase outputs respectively, and the modulators 18, 19 and 20 are connected to the 240 degree phase, the 0 degree phase and the 120 degree phase outputs respectively.

The output circuit of the modulators 12, 13 and 14 are connected in series between a pair of system output terminals 21, and, in a similar manner, the output circuits of the modulators 15, 16 and 17 and those of the modulators 18, 19 and 20 are connected in series between system output terminals 22 and 24 respectively to provide a three phase system output.

The input of a frequency discriminator 25 is connected to the phase 3 output terminals 24. The frequency discriminator 25 produces a direct current voltage which is proportional to the output frequency. This direct current voltage is supplied to the square wave source 11 which also receives direct current power from three rectifiers 26 each of which is connected to a different phase output of the alternator. The input of a voltage regulator 27 is connected to each pair of output terminals 21, 22 and 23 and the output of the regulator is connected to the field winding (not shown) of the alternator.

Figure 2:
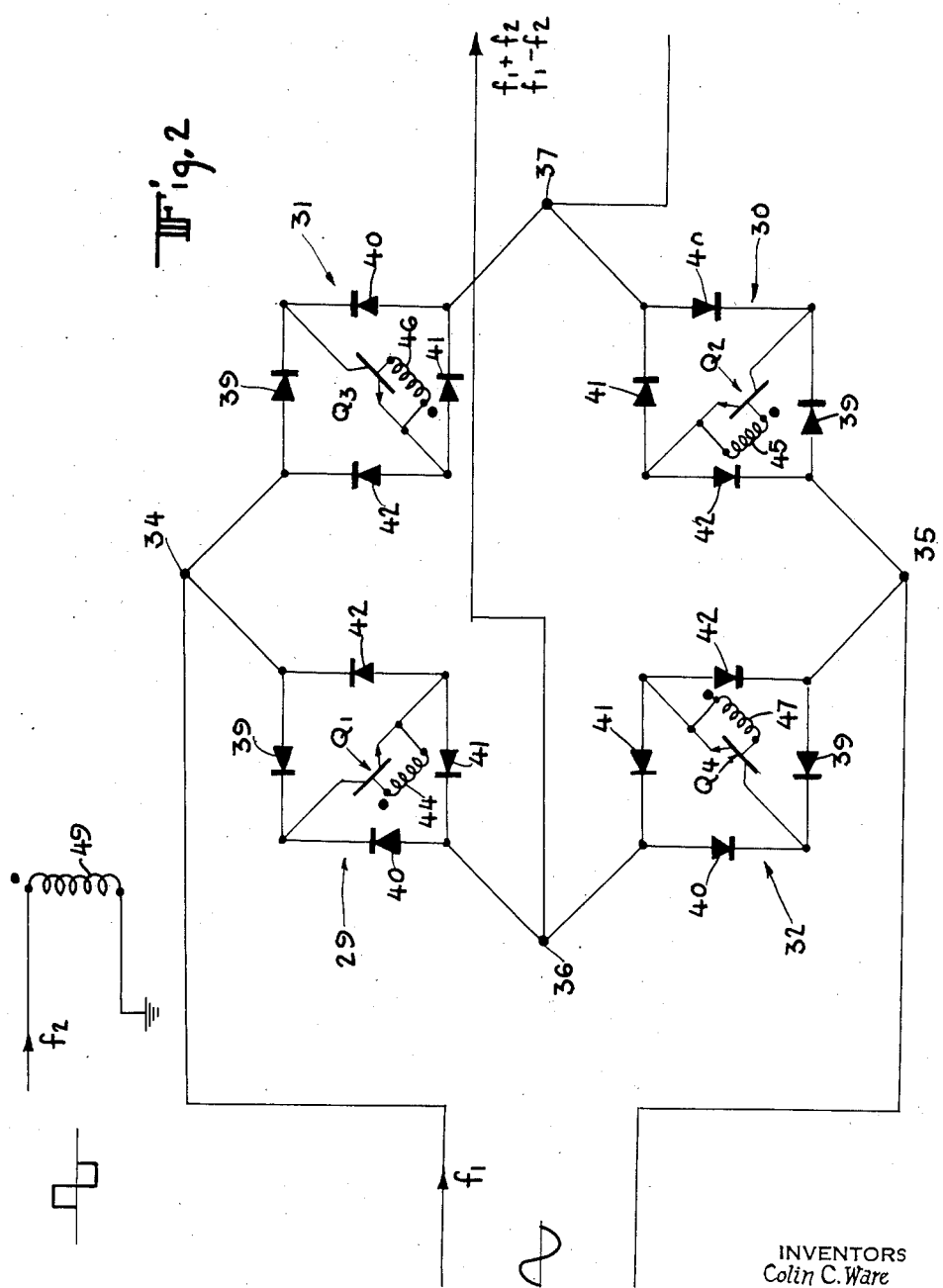
Fig. 2 is a circuit diagram of a portion of the system shown in Fig. 1.

The switch modulators 12 to 20 are identical, one of them being shown in Fig. 2 as comprising four rectifying bridges 29, 30, 31, and 32 connected together to form a bridge having input terminals 34 and 35 for connection to the alternator 10 and having output terminals 36 and 37 to which the load is connected. Each of the rectifying bridges 29, 30, 31 and 32 includes four diodes 39, 40, 41 and 42, and across each of the bridges, NPN power transistors Q1, Q2, Q3 and Q4 are respectively connected, each transistor having its collector connected to the junction of the diodes 39 and 40, and its emitter connected to the junction of the diodes 41 and 42. Inductances 44, 45, 46 and 47 are connected respectively between the base and the emitter of each of the transistors Q1, Q2, Q3 and Q4 and are inductively coupled to an inductance 49 which is connected to the one of the outputs of the square wave source 11. The inductances are so arranged that, when the dot end of inductance 49 is positive, the voltages induced in inductances 44, 45, 46 and 47 cause the dot ends of these inductances also to be positive.

In operation, the alternator 10 has an output frequency $f_1$, which varies in accordance with the speed of the driving engine, and the square wave source 11 produces a frequency $f_2$ which is varied by the frequency discriminator 25, as described hereinafter, to maintain the difference between the frequencies $f_1$ and $f_2$ constant and equal to the desired output frequency, so that the system produces constant frequency output power.

The present invention can be utilized to supply any of various output frequencies by designing the square wave source 11 to produce a frequency $f_2$ which is either greater than or less than the alternator frequency $f_1$ by an amount equal to the desired output frequency. For the purpose of explanation, it is assumed that 400 cycle per second power is desired to be delivered to the loads, and that the square wave source frequency $f_2$ is greater than the alternator frequency $f_1$. It is further assumed that the alternator frequency $f_1$ at a particular moment is 3000 cycles per second. The square wave source 11 is then designed to have a frequency $f_2$ at this moment of 3400 cycles per second. The wave forms of the outputs of the three phases of the alternator as they appear at points A, D and G in Fig. 1, and the outputs of the three phases of the square wave source as they appear at points B, E and H, in Figs. 1 are shown respectively as waveforms A, D, G, B, E, and H in Fig. 3.

As shown in Fig. 2 one phase of the alternator output is impressed across the input terminals 34 and 35 of each switch modulator, and one phase of the square wave source output is passed through the inductance 49 of each switch modulator. It will be seen that the transistors Q1 and Q2 can conduct when the square wave generator output passing through the inductance 49 (waveform B, E or H) is in its positive half cycle and transistors Q3 and Q4 can conduct when this output is in its negative half cycle. It will also be seen that when the alternator output impressed across terminals 34 and 35 (waveform A, D or G) is in its positive half cycle current will flow from terminal 34 through one of the bridges 29 or 31, through the load, and through one of the bridges 30 or 32 to the terminal 35. Likewise, current will flow in a similar manner from the terminal 35 to the terminal 34 when the alternator output is in its negative half cycle.

To more fully describe the operation of the switch modulators 12 to 20, the action of modulator 12 during one complete cycle of the waveform A will now be analyzed. During time $t_0$ to $t_1$ (indicated in Fig. 3) when both waveforms are in their positive half cycles, the transistors Q1 and Q2 are conducting and the terminal 34 is positive with respect to the terminal 35, therefore, current flows from the terminal 34 through the bridge 29 (diode 39, transistor Q1, and diode 41) to the terminal 36, through the load and the modulators 13 and 14 to the terminal 37, and through the bridge 30 (diode 40, transistor Q2, and diode 42) to the terminal 35. At time $t_1$ while the waveform A is still positive, the waveform B starts its negative half cycle placing transistors Q3 and Q4 in conduction. Therefore, during $t_1$ to $t_2$, current flows from the terminal 34 through the bridge 31 (diode 39, transistor Q3, diode 41) and the load to the terminal 36, and through the bridge 32 (diode 40, transistor Q4, diode 42) to terminal 35. The waveform A starts its negative half cycle at time $t_2$, therefore from time $t_2$ to $t_3$, while the transistors Q3 and Q4 are still conducting, the terminal 34 is negative with respect to the terminal 35 and current flows from the terminal 35 through the bridge 32 to the terminal 36, through the load to the terminal 37, and through the bridge 31 to the terminal 34. At time $t_3$, the waveform B starts its second positive half cycle and therefore in the final portion of the first cycle to the waveform A (time $t_3$ to $t_4$), the terminal 34 is still negative with respect to the terminal 35 and the transistors Q1 and Q2 are conducting. Current then flows from the terminal 35 through the bridge 30 to the terminal 37, through the load to the terminal 36, and through the bridge 29 to the terminal 34.

From the above analyses, it will be seen that the modulator at all times provides a low resistance current path between its input terminals 34 and 35 and its output terminals 36 and 37, whereby substantially all of the electrical energy available at the alternator is passed through the modulator.

Figure 3:
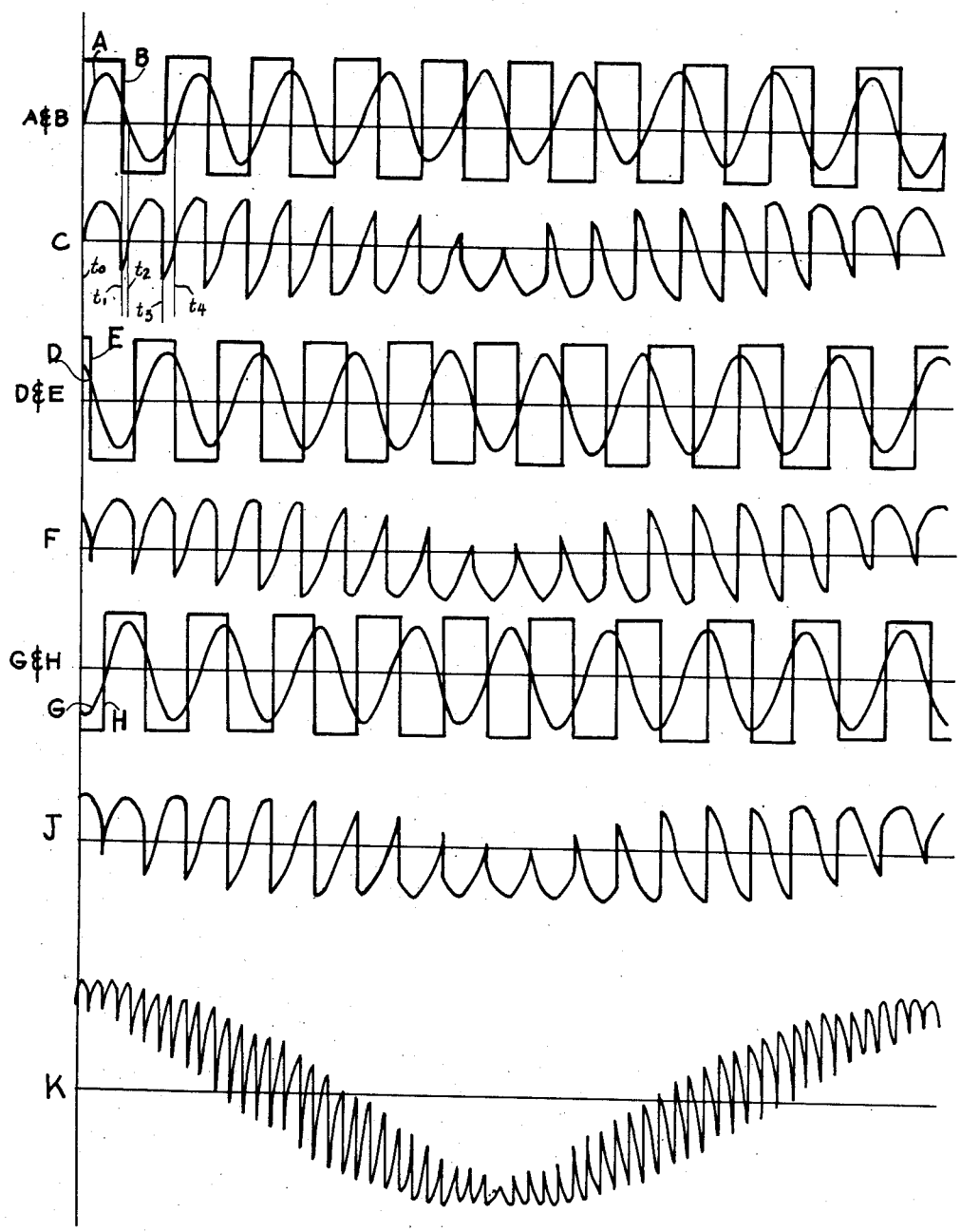
Fig. 3 is a plot of the wave form at the points A, B, C, D, E, F, G, H, J and K in Fig. 1.

The voltage waveform of the output of modulator 12, as it appears at points C in Fig. 1, is shown in Fig. 3 as the waveform C. This waveform has two frequency components, one equal to the sum of the frequencies of the waveforms A and B and the other equal to the difference of the frequencies of the waveforms A and B. These sum and difference frequencies, graphically referred to as $f_1+f_2$ and $f_1-f_2$, can be considered to be and will be referred to hereinafter and in the claims as the fundamental side band frequencies of the alternator output frequency $f_1$.

The modulators 13 to 20 operate in the same manner as the modulator 12 to produce output waveforms which are similar in configuration although displaced in time. The voltage waveforms of the outputs of the modulators 13 and 14 as they appear at points F and J in Fig. 1 are shown in Fig. 3 as waveforms F and J respectively.

If, as assumed, the alternator frequency $f_1$ is 3000 cycles per second and the square wave generator frequency $f_2$ is 3,400 cycles per second, then the waveforms C, F and J each contain an upper fundamental side band frequency $(f_1+f_2)$ of 6,400 cycles per second and a lower fundamental side band frequency $(f_1-f_2)$ of 400 cycles per second.

The series connection of the output circuits of the modulators 12, 13 and 14 produces at terminals 21 a voltage waveform which is the sum of the individual modulator output waveforms C, F and J. This resultant waveform is shown in Fig. 3 as waveform K and has at each point in time an amplitude which is equal to the sum of the amplitude of waveforms C, F and J at that point in time. It can be shown mathematically and can be seen from inspection of waveform K that the output power is predominantly at the lower side band frequency $(f_1-f_2)$ and that the upper side band frequency $(f_1+f_2)$ present in the waveforms C, F and J is not present in the system output which contains only a large amplitude component of the desired frequency (400 cycles) and a small amplitude component of a frequency much higher than the upper side band frequency.

The outputs of modulators 15, 16 and 17 and those of modulators 18, 19 and 20 are summed in a similar manner to produce output waveforms at terminals 22 and terminals 24 which are 120 degrees out of phase with each other and with the waveform K.

The character of the output waveforms can be defined mathematically as follows.

The instantaneous voltage of any of the alternator outputs at any time $t$ is defined by the equation.

(1) $\qquad e_1 = E_{1\text{Max}} \sin(w_1 t + \theta_1)$ where $e_1$ is the instantaneous voltage of any of the waveforms A, D or G at the time $t$, $E_{1\text{Max}}$ is the maximum voltage of any of the waveforms A, D or G, $w_1$ is the angular velocity of the frequency $f_1$, and $\theta_1$ is the phase angle of the waveform.

The instantaneous output voltage of any of the modulators is equal in magnitude to the instantaneous input voltage from the alternator $e_1$, but is reversed in polarity, at the rate $f_2$. Mathematically, this is equivalent to multiplying the input voltage $e_1$ by a square wave having unity magnitude and a frequency of $f_2$.

The Fourier analysis of a square wave gives the equation (2)
$$e_2 = A_1 \sin(Wt+\theta) + \frac{A_1}{3} \sin 3(wt+\theta)$$
$$+ \frac{A_1}{5} \sin 5(wt+\theta) + \frac{A_1}{7} \sin 7(wt+\theta) \ldots \text{etc.}$$

where $A_1$ is equal to $$\frac{4}{\pi}$$

times the magnitude of the square wave.

Therefore, the components of a square wave having unity magnitude and a frequency of $f_2$ is defined by the equation (3)
$$e_2 = \frac{4}{\pi}\left[ \sin(w_2 t + \theta_2) + \frac{1}{3}\sin 3(w_2 t+\theta_2) \right.$$
$$\left. + \frac{1}{5}\sin 5(w_2 t+\theta_2) + \frac{1}{7}\sin 7(w_2 t+\theta_2) \ldots \text{etc.} \right]$$

where $w_2$ is the angular velocity of the frequency $f_2$, and $\theta_2$ is the phase angle of the square wave.

By multiplying the Equations 1 and 3 and applying the identity $$\sin A \sin B = \tfrac{1}{2}[\cos(A-B) - \cos(A+B)]$$

the result is that the instantaneous output voltage of any of the modulators is defined by the equation (4)
$$e_0 = \frac{2}{\pi} E_{1\,\text{max}}\left[ \cos(w_1 t - w_2 t + \theta_1 - \theta_2) \right.$$
$$- \cos(w_1 t + w_2 t + \theta_1 + \theta_2) + \frac{\cos}{3}(w_1 t - 3w_2 t + \theta_1 - 3\theta_2)$$
$$- \frac{\cos}{3}(w_1 t + 3w_2 t + \theta_1 + 3\theta_2) + \frac{\cos}{5}(w_1 t - 5w_2 t + \theta_1 - 5\theta_2)$$
$$\left. - \frac{\cos}{5}(w_1 t + 5w_2 t + \theta_1 + 5\theta_2) \ldots \text{etc.} \right]$$

To find the instantaneous output voltage of modulator 12, 0 degrees is substituted for $\theta_1$ and $\theta_2$ in Equation 4 giving (5)
$$e_{0_{12}} = \frac{2}{\pi} E_{1\,\text{max}}\left[ \cos(w_1 t - w_2 t) - \cos(w_1 t + w_2 t) \right.$$
$$+ \frac{\cos}{3}(w_1 t - 3w_2 t) - \frac{\cos}{3}(w_1 t + 3w_2 t)$$
$$\left. + \frac{\cos}{5}(w_1 t - 5w_2 t) - \frac{\cos}{5}(w_1 t + 5w_2 t) \ldots \text{etc.} \right]$$

By substituting 120 degrees for $\theta_1$ and $\theta_2$ in Equation 4, the instantaneous output voltage of modulator 13 is given as (6)
$$e_{0_{13}} = \frac{2}{\pi} E_{1\,\text{max}}\left[ \cos(w_1 t - w_2 t) - \cos(w_1 t + w_2 t + 240°) \right.$$
$$+ \frac{\cos}{3}(w_1 t - 3w_2 t - 240°) - \frac{\cos}{3}(w_1 t + 3w_2 t + 120°)$$
$$\left. + \frac{\cos}{5}(w_1 t - 5w_2 t - 120°) - \frac{\cos}{5}(w_1 t + 5w_2 t + 360°) \ldots \text{etc.} \right]$$

The instantaneous voltage of modulator 14 is given by substituting 240 degrees for $\theta_1$ and $\theta_2$ in Equation 4, as (7)
$$e_{0_{14}} = \frac{2}{\pi} E_{1\,\text{max}}\left[ \cos(w_1 t - w_2 t) - \cos(w_1 t + w_2 t + 120°) \right.$$
$$+ \frac{\cos}{3}(w_1 t - 3w_2 t - 120°) - \frac{\cos}{3}(w_1 t + 3w_2 t + 240°)$$
$$\left. + \frac{\cos}{5}(w_1 t - 5w_2 t - 240°) - \frac{\cos}{5}(w_1 t + 5w_2 t + 360°) \ldots \text{etc.} \right]$$

The instantaneous voltage of the waveform K is obtained by adding the Equations 5, 6 and 7. To simplify this addition it will first be shown that (8) $\qquad -\cos\phi - \cos(\phi+240) - \cos(\phi+120) = 0$ and that (9) $\qquad \cos\phi + \cos(\phi-240) + \cos(\phi-120) = 0$ as follows:

(8a) $\qquad -\cos\phi - \cos(\phi+240) - \cos(\phi+120)$
$\qquad\qquad = -\cos\phi + \cos(\phi+60) + \cos(60-\phi)$ and (9a) $\qquad \cos\phi + \cos(\phi-240) + \cos(\phi-120)$
$\qquad\qquad = \cos\phi - \cos(60-\phi) - \cos(60+\phi)$ By using the identities $$\cos(A+B) = \cos A \cos B - \sin A \sin B$$

and $$\cos(A-B) = \cos A \cos B + \sin A \sin B$$

in Equations 8a and 9a we find that (8b)

$$-\cos \underline{\phi} - \cos (\underline{\phi}+240) - \cos (\underline{\phi}+120) = -\cos \underline{\phi} + \cos \underline{\phi} \cos 60 - \sin \underline{\phi} \sin 60 + \cos \underline{\phi} \cos 60 + \sin \underline{\phi} \sin 60$$
$$= -\cos \underline{\phi} + 2 \cos \underline{\phi} \cos 60$$
$$= -\cos \underline{\phi} + 2 (.5) \cos \underline{\phi}$$
$$= 0$$

and (9b)

$$\cos \underline{\phi} + \cos (\underline{\phi}-240) + \cos (\underline{\phi}-120) = \cos \underline{\phi} - (\cos 60 \cos \underline{\phi} + \sin 60 \sin \underline{\phi}) - (\cos 60 \cos \underline{\phi} - \sin 60 \cdot \sin \underline{\phi})$$
$$= \cos \underline{\phi} - 2 \cos 60 \cos \underline{\phi}$$
$$= 0$$

By applying Equation 8 and 9 to the sum of Equations 5, 6 and 7, we find that the waveform K is defined by the equation $$e_{s_1} = \frac{2}{\pi} E_{1 \text{ max}} \left[ 3 \cos (w_1 t - w_2 t) - \frac{3}{5} \cos (w_1 t + 5 w_2 t) \right]$$

or (10)

$$e_{s_1} = \frac{6}{\pi} E_{1 \text{ max}} \left[ \cos (w_1 - w_2) t - \frac{1}{5} \cos (w_1 + 5 w_2) t \right]$$

From Equation 10 it may be seen that waveform K has a large amplitude lower side band $(f_1-f_2)$ component of the desired frequency (400 cycles per second) and a small amplitude high frequency $(f_1+5f_2)$ component of 20,000 cycles per second.

By repeating these computations for modulators 15, 16 and 17 and modulators 18, 19 and 20, it will be seen that the waveforms of the outputs at terminals 22, and 24 are identical to waveform K but displaced in time 120 degrees and 240 degrees respectively.

These system outputs can be used directly as a 400 cycle per second power supply for applications where the high frequency ripple would not have an effect, such as driving a motor, or, since the frequency of the secondary frequency components are very high, the power at the outputs can be passed through a suitable device such as a very simple and light weight low pass filter to provide smooth 400 cycle waveform.

As the speed of the driving engine varies, the frequency and voltage of each of the alternator outputs also varies thereby tending to cause similar variations in the lower side band frequency (400 cycle) power supplied at each of the system output terminals. The voltage regulator 27 immediately senses any output voltage changes and adjusts the excitation of the alternator so that the voltage at the system output terminals remains constant.

The constant voltage system output is sampled by the frequency discriminator 25 which senses any change in frequency and continually adjusts the square wave source so that its frequency is always 400 cycles per second above the alternator output frequency. For example, if the alternator output frequency increases from 3000 cycles per second to 3010 cycles per second, the frequency discriminator causes the square wave generator frequency to increase from 3400 cycles per second to 3410 cycles per second. Current having a constant lower side band frequency of 400 cycles per second is thereby supplied at each of the system output terminals.

To accomplish this function, the frequency discriminator 25 may include an "m" derived filter connected to the system output terminals 24, a full wave rectifier connected to the output of the "m" derived filter, and a smoothing filter connected to the output of the full wave rectifier. The "m" derived filter has an output voltage which is proportional to the input frequency, and, therefore, the smoothing filter produces a D.C. voltage which is proportional to the frequency at the input of the "m" derived filter, and is applied to the square wave source to vary the frequency of its output. Other types of frequency discriminators, such as the Foster-Seeley discriminator, may be used instead of the type of discriminator just described.

The square wave source may be a frequency division multivibrator which includes a master multivibrator producing a square wave having a frequency of $6f_2$; a differentiating network which is connected to the output of the master multivibrator to produce positive and negative going spiked pulses having a frequency of $6f_2$ in response to the leading and trailing edges of the square wave; a circuit for clipping the negative pulses thereby leaving positive spiked pulses having a frequency of $3f_2$; a pulse selecting circuit connected to the output of the clipping circuit and having three output circuits and operating such that the 1st, 4th, 7th, etc. positive pulses appear in one output circuit, the 3rd, 6th, 9th, etc. positive pulses appear in another output circuit, and the 5th, 8th, 11th, etc. pulses appear in the third output circuit; and three multivibrators each connected to one of the outputs of the pulse selecting circuit and arranged to be triggered by the even numbered pulses to produce the positive half cycle of a square wave and triggered by the odd number pulses to produce the negative half cycle of the square wave. These three multivibrators, therefore, produce square waves which have a frequency $f_2$, and are phased such that these square waves are 120 degrees out of phase with each other.

The D.C. voltage from the frequency discriminator 15 is applied as bias to the master multivibrator. Since the frequency of a multivibrator is dependent upon bias voltage, the frequency of the square wave generated by the master multivibrator will vary as the input frequency of the frequency discriminator 25 varies, thus varying the frequency $f_2$ of each of the phased multivibrators. If the frequency discriminator 25 is designed such that a small change in its input frequency produces a great change in the frequency of the master multivibrator and therefore the phased multivibrators, then the alternator frequency may vary widely with only a slight variation in the frequency of the outputs of the system. For example, if the bias produced by a frequency of 399 cycles per second at the input of the discriminator causes the square wave source to produce a frequency of 3400 cycles, and the bias produced by a discriminator input frequency of 401 cycles per second causes the square wave source to produce a frequency of 6,400 cycles, then the alternator output frequency may vary from 3,001 cycles per second to 5,999 cycles per second with only a 2 cycle per second variation in the frequency at the output terminals of the system.

To provide B+ power for the square wave source a portion of each of the alternator outputs is rectified in the rectifiers 26 which preferably are of the full wave type, and the outputs of the rectifiers, which are out of phase, are connected in parallel to provide a relatively smooth D.C. voltage. In this manner smooth B+ power is provided using the minimum number of components. This B+ power could also be obtained by taking a portion of the modulator output and passing it through a high pass filter before rectifying it.

Three phase constant frequency power may be obtained from a common three phase, three wire alternator by modifying the above described system as shown in Fig. 4.

The system of Fig. 4 is identical with that of Fig. 1 except that the inputs of the modulators 12, 15 and 18 are connected in parallel to one phase of a three phase three wire alternator 50, the inputs of the modulators 13, 16 and 19 are connected in parallel to a second phase of the alternator, the inputs of the modulators 14, 17 and 20 are connected in parallel to the third phase of the alternator, and an isolating transformer 51 is placed in the output circuit of each of the modulators 12 to 20.

The operation of the system is similar to that described in connection with Fig. 1 and the waveforms appearing at points A, B, C, D, E, F, G, H, J and K are similar to those shown in Fig. 3. The output circuits of the modulators are connected in series as in the system of Fig. 1, and the transformers 51 prevent the operation of any of the modulators from effecting the current flowing through those modulators whose output circuits are not connected in series with the output circuit thereof.

In Fig. 5 there is shown another system for supplying three phase power which is similar to the systems of Figs. 1 and 4. This system generally comprises a two phase alternator 52, a square wave generator source 54 producing six wave trains of square waves having different phases and six switch modulators 55 to 60 each identical to the modulator shown in Fig. 2 and each connected to one phase of the alternator and to one phase of the square wave source.

The alternator outputs are displaced 90 degrees in phase, therefore, one of these outputs may be considered to have a 0 degree phase angle and the other output a 90 degree phase angle. Each of the modulators 55, 57 and 59 are connected to the 0 degree phase output of the alternator, while modulators 56, 58 and 60 are connected to the 90 phase output.

The square wave source 54 has a first output which will be considered to have a phase angle of 0 degree, a second output which is displaced from the first output by 90 degrees, a third output which is displaced from the first output by 120 degrees, a fourth output which is displaced from the second output by 120 degrees, a fifth output which is displaced from the first and third outputs by 120 degrees, and a sixth output which is displaced from the second and fourth outputs by 120 degrees. The outputs of the square wave source, therefore, have phase angle of 0 degree, 90 degrees, 120 degrees, 210 degrees, 240 degrees and 330 degrees, and these outputs are respectively connected to the modulators 55, 56, 57, 58, 59 and 60.

The output circuits of the modulators 55 and 56 are connected in series between system output terminals 61, and in the same manner the output circuits of the modulators 57 and 58 and those of the modulators 59 and 60 are connected in series between system output terminals 62 and 64 respectively to provide a three phase system output.

As in the systems of Figs. 1 and 4, the input of a frequency discriminator 65 is connected to the output terminals 64 and the output of the discriminator 65 is connected to the square wave source 54 which receives direct current power from two rectifiers 66 each connected to a different phase of the alternator output. Also, a voltage regulator 67 is connected to each pair of output terminals and to the field winding (not shown) of the alternator.

The operation of this system is similar to that of the system shown in Figs. 1 and 4, and by applying Formula 4 it will be seen that the outputs of modulators 55 and 56 are defined by the equations $$e_{o_{55}} = \frac{2}{\pi} E_{1\,max} \left[ \cos\,(w_1t - w_2t) - \cos\,(w_1t + w_2t) \right.$$

$$\left. + \frac{\cos}{3}(w_1t - 3w_2t) - \frac{\cos}{3}(w_1t + 3w_2t) \ldots \text{etc.} \right]$$

and $$e_{o_{56}} = \frac{2}{\pi} E_{1\,max} \left[ \cos\,(w_1t - w_2t) - \cos\,(w_1t + w_2t + 180) \right.$$

$$\left. + \frac{\cos}{3}(w_1t - 3w_2t - 180) - \frac{\cos}{3}(w_1t + 3w_2t) \ldots \text{etc.} \right]$$

wherefore the output waveform at the terminals 61 is defined by the equation (11)

$$e_{o_{61}} = \frac{4}{\pi} E_{1\,max} \left[ \cos\,(w_1t - w_2t) - \frac{\cos}{3}(w_1t + 3w_2t) \ldots \text{etc.} \right]$$

If, as before, it is assumed that the alternator frequency $f_1$ is 3000 cycles per second and the square wave frequency $f_2$ is 3400 cycles per second then it will be seen that the output waveform at terminals 61 contains a large amplitude 400 cycle per second $(f_1 - f_2)$ component and a small amplitude 13,200 cycle per second $(f_1 + 3f_2)$ component which if desired may be filtered out with comparative ease.

By repeating the above computations for modulators 57 and 58 and for modulators 59 and 60 it will be seen that the waveforms at the output terminals 62 and 64 are identical to the waveform at terminals 61 but displaced in time 120 degrees and 240 degrees respectively to provide three phase output power.

With the exception of the alternator 52 and the square wave source 54, the components of this system may be identical with those used in the systems shown in Figs. 1 and 4.

The square wave source 54 may be a frequency division multivibrator which includes a master multivibrator producing a square wave having a frequency of $12f_2$; a differentiating network which is connected to the output of the master multivibrator to produce positive and negative going spiked pulses having a frequency of $12f_2$ in response to the leading and trailing edges of the square wave; a circuit for clipping the negative pulses thereby leaving positive pulses having a frequency of $6f_2$ a pulse selecting circuit connected to the output of the clipping circuit and having six output circuits and operating so that the 1st, 7th, 13th, 19th, etc. positive pulses appear in the first (0 degree) output, the 4th, 10th, etc. pulses appear in the second (90 degree) output, the 5th, 11th, etc. pulses appear in the third (120 degree) output, the 8th, 14th, etc. pulses appear in the fourth (210 degree) output, the 9th, 15th, etc. pulses appear in the fifth (240 degree) output, and the 12th, 18th, etc. pulses appear in the sixth (330 degree) output; and six multivibrators each connected to one of these outputs and arranged to be triggered by the 1st, 4th, 5th, 8th, 9th, 12th, 13th, etc. pulses to produce the positive half cycles of the square wave and triggered by the 7th, 10th, 11th, 14th, 15th, 18th, 19th, etc. pulses to produce the negative half cycle of the square wave. These six multivibrators, therefore, produce square waves having a frequency $f_2$ and phase angles of 0, 90, 120, 210, 240 and 330 degrees.

With currently available transistors, each switch modulator can handle a current of 29 amperes at a modulator output voltage of 115 volts. In the systems shown in Figs. 1 and 4 the system output voltage is three times the modulator output voltage, therefore, if we consider a system output current of 29 amperes and a modulator output voltage of 115 volts it may be seen that each output phase of the system furnishes about 10 kilo volt-amperes so that the total system output for the three phases is 30 kilo volt-amperes. In the system shown in Fig. 5, the system output voltage, is twice the modulator output voltage, wherefore, each output phase of the system furnishes about 6.66 kilo volt-amperes and the total system output is 20 kilo volt-amperes.

In these systems all of the power available at the generator is delivered to the loads except for a small amount of power consumed by the square wave generator, the voltage regulator, the frequency discriminator, and the voltage drop across the modulators. Therefore, to supply a given number of volt-amperes to the loads, the alternator need be only slightly larger than an alternator which will supply the same output at an uncontrolled frequency.

From the foregoing description, it will be seen that the present invention provides a light weight power supply system in which the output of a poly-phase power source is modified in frequency in a simple, practical, efficient and economical manner to provide a controlled frequency power supply output.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A system for supplying controlled frequency power comprising a source of multiple phase alternating current power, a source of multiple phase controlled frequency, a plurality of means each connected to one phase of said power source and to one phase of said controlled frequency source for producing output power at the side band frequencies of the frequency of said power source and each having an output circuit, said output circuits of at least two of said means being connected together in a manner to produce a system output power having frequency components which include only one of the fundamental side band frequencies, and controlling means connected to said controlled frequency source to vary the frequency of said controlled source to control the predominant frequency of the system output power.

2. A system for supplying controlled frequency power comprising a source of multiple phase alternating current power, a source of multiple phase controlled frequency, a plurality of modulators having input circuits connected to said power source and to said controlled frequency source and having an output circuit, each of said modulators being connected to one phase of said power source and to one phase of said controlled frequency source and producing output power at the side band frequencies of the frequency of said power source, said output circuits of at least two of said modulators being connected together in a summing arrangement to remove one of the fundamental side band frequencies thereby producing system output power predominantly at the other fundamental side band frequency, and controlling means connected to said controlled frequency source to vary the frequency of said controlled source to control the predominant frequency of the system output power.

3. A system according to claim 2, wherein at least some of said modulators are arranged in a group consisting of one modulator connected to each phase of said power source and said output circuits of said modulators in the group are connected together in series.

4. A system for supplying controlled frequency power comprising a source of multiple phase alternating current power having at least two outputs which differ in phase angle, a source of multiple phase controlled frequency having at least two outputs which differ in phase angle, the outputs of said controlled frequency source each having a phase angle which differs from the phase angle of another output of said controlled frequency source by an amount equal to the difference in phase angle between two outputs of said power source, and a plurality of modulators each having input circuits connected to only one phase of said power source and to only one phase of said controlled frequency source and having an output circuit and producing output power at the side band frequencies of the frequency of said power source, said output circuits of at least two of said modulators being connected together in series to remove one of the fundamental side band frequencies thereby producing system output power predominantly at the other fundamental side band frequency, and controlling means connected to said controlled frequency source to vary the frequency of said controlled source to control the predominant frequency of the system output power.

5. A system according to claim 4, wherein at least some of said modulators are arranged in a group consisting of one modulator connected to each phase of said power source and said output circuits of said modulators in the group are connected together in series.

6. A system for supplying controlled frequency power comprising a source of multiple phase variable frequency alternating current power having at least two outputs which differ in phase angle, a source of multiple phase controlled frequency having at least two outputs which differ in phase angle, the outputs of said controlled frequency source each having a phase angle which differs from the phase angle of another output of said controlled frequency source by an amount equal to the difference in phase angle between two outputs of said power source, and a plurality of modulators each having input circuits connected to only one phase of said power source and to only one phase of said controlled frequency source and having an output circuit and producing output power at the side band frequencies of the frequency of said power source, said modulators being arranged in groups, each group consisting of one modulator connected to each phase of said power source, said output circuits of said modulators in each group being connected together in series to remove one of the fundamental side band frequencies thereby producing system output power predominantly at the other fundamental side band frequency and controlling means responsive to the frequency of said power source and connected to said controlled frequency source in a mnaner to maintain the predominant side band frequency in the system output constant.

7. Apparatus for converting polyphase power produced by an alternating current power source into power of a different frequency comprising in combination a source of polyphase controlled frequency, and a plurality of means for producing power at the side band frequencies of the frequency of the power source each having an input circuit for connection to one phase of the power source, an input circuit connected to one phase of said controlled frequency source, and an output circuit, said output circuits being connected together in a manner to remove one of the fundamental side band frequencies thereby producing system output power predominantly at the other fundamental side band frequency.

8. Apparatus for converting polyphase power produced by an alternating current power source having at least two outputs which differ in phase angle into power of a different frequency comprising in combination a source of multiple phase controlled frequency having at least two outputs which differ in phase angle, the outputs of said controlled frequency source each having a phase angle which differs from the phase angle of another output of said controlled frequency source by an amount equal to the difference in phase angle between two outputs of the power source, and a plurality of modulators each having an input circuit connected to only one phase of said controlled frequency source and having an output circuit and producing output power at the side band frequencies of the frequency of the power source, said output circuits of at least two of said modulators being connected together in a voltage summing arrangement to remove one of the fundamental side band frequencies thereby producing system output power predominantly at the other fundamental side band frequency.

9. A system for supplying power of a predetermined frequency comprising means for producing multiple phase alternating current of a first frequency, said power producing means having separate outputs for different phases, means for producing a plurality of wave trains of square wave pulses of different phase at a controlled second frequency, said square wave producing means having separate outputs for wave trains of different phase, a plurality of modulators having input and output circuits, means connecting the inputs of each of said modulators to one output of said power producing means and to one output of said square wave producing means, each of said modulators producing output power at the fundamental sideband frequencies of said first frequency, means interconnecting the outputs of at least two of said modulators in a manner such that said connected modulators produce a system output power having frequency components which include only one of said fundamental sideband frequencies, the frequency of said one sideband being desirably equal to said predetermined frequency, and means for varying the frequency of said square waves so as to control the frequency of said fundamental sideband frequencies so that the frequency of said one sideband substantially equals said predetermined frequency.

10. A system for supplying power of a predetermined frequency comprising means for producing multiple phase alternating current of a first frequency, said power producing means having separate outputs for different phases, means for producing a plurality of wave trains of square wave pulses of different phase at a controlled second frequency, said square wave producing means having separate outputs for wave trains of different phase, a plurality of switch modulators having input and output circuits, means connecting the inputs of each of said modulators to one output of said power producing means and to one output of said square wave producing means, each of said modulators producing output power at the fundamental sideband frequencies of said first frequency, means connecting the outputs of at least two of said modulators in a summing arrangement, said connected modulators producing a system output power having frequency components which include only the lower sideband of said fundamental sideband frequencies, the frequency of said lower sideband being desirably equal to said predetermined frequency, and means for varying the frequency of said square waves so as to control the frequency of said fundamental sideband frequencies so that the frequency of said lower sideband substantially equals said predetermined frequency.

11. A system for supplying power of a predetermined frequency comprising means for producing multiple phase alternating current of a variable first frequency, said power producing means having separate outputs for different phases, means for producing a plurality of wave trains of square wave pulses of different phase at a controlled second frequency, said square wave producing means having separate outputs for wave trains of different phase, a plurality of switch modulators having input and output circuits, means connecting the inputs of each of said modulators to one output of said power producing means and to one output of said square wave producing means, each of said modulators producing output power at the fundamental sideband frequencies of said first frequency, means connecting the outputs of at least two of said modulators in a voltage summing arrangement, said connected modulators producing a system output power having frequency components which include only the lower sideband of said fundamental sideband frequencies, the frequency of said lower sideband being desirably equal to said predetermined frequency, and means responsive to the frequency of said lower sideband component to vary the frequency of said square waves so as to control the frequency of said fundamental sideband frequencies so that the frequency of said lower side band substantially equals said predetermined frequency.

12. A system for supplying power of a predetermined frequency comprising means for producing multiple phase alternating current power of a first frequency, the phase angle of each of said phases differing from the phase angle of the other phases by a predetermined electrical phase angle, said power producing means having separate outputs for different phases, means for producing a plurality of wave trains of square wave pulses at a controlled second frequency, each of said wave trains differing in phase from another of said wave trains by an amount equal to said predetermined electrical phase angle, said square wave producing means having separate outputs for wave trains of different phase, a plurality of groups of switch modulators, each of said modulators in said groups having input and output circuits, means respectively connecting each of said modulators of each of said groups to a respective one of said phase outputs of said power producing means, means connecting each of said modulators to one of said outputs of said square wave pulse producing means, each of said modulators of each of said groups producing output power at the fundamental sideband frequencies of said first frequency, means connecting the outputs of the modulators of each of said groups in a voltage summing arrangement to produce output power having frequency components which include only the lower fundamental sideband frequency, the frequency of said lower sideband being desirably equal to said predetermined frequency, and the output power of said modulator groups differing in phase, and means for varying the frequency of said square waves so as to control the frequency of said fundamental sideband frequencies so that said lower sideband substantially equals said predetermined frequency.

13. A system for supplying power of a predetermined frequency comprising means for producing multiple phase alternating current power of a variable first frequency, the phase angle of each of said phases differing from the phase angle of the other phases by a predetermined electrical phase angle, said power producing means having an output for each of said phases, means for producing a plurality of wave trains of square wave pulses at a controlled second frequency, each of said wave trains differing from each other in phase by an amount equal to said predetermined electrical phase angle, said square wave producing means having an output for each of said wave trains of a different phase, a plurality of groups of modulators, each of said modulators in said groups having input and output circuits, means respectively connecting each of said modulators of each of said groups to a respective one of said phase outputs of said power producing means, means connecting the modulators of one of said groups to the output of said square wave pulse producing means having a wave train with the same phase angle as the phase angle of the output of the power producing means to which the respective modulators are connected, means connecting the modulators of the other groups to the outputs of said square wave pulse producing means having a wave train of a phase angle which differs from said phase angle of the output of the power producing means connected to said modulator by said predetermined phase angle, each of said modulators of each of said groups producing output power at the sidebands of said first frequency, means connecting the outputs of the modulators of each of said groups in series to produce output power having frequency components which include only the lower sideband components of the fundamental sideband frequency, the frequency of said lower sideband component being desirably equal to said predetermined frequency, the output power from one of said modulator groups differing in phase from the output power of the other of said modulator groups by said predetermined phase angle and means responsive to the frequency of the said lower sideband to vary the frequency of said square waves so as to control the frequency of said fundamental sideband frequencies so that said lower sideband component substantially equals said predetermined frequency.

14. Apparatus for converting polyphase power produced by an alternating current power source into power of a different frequency comprising in combination means for producing a plurality of wave trains of square wave pulses of different phase at a controlled frequency, said square wave producing means having separate outputs for wave trains of different phase; a plurality of modulators having an input circuit for connection to one phase output of the power source, an input circuit for connection to one phase output of said square wave producing means, and an output circuit; means connecting an input of each of said modulators to one output of said square wave producing means, each of said modulators producing output power at the fundamental sideband frequencies of the frequency of the power source; and means connecting the outputs of at least two of said modulators in a summing arrangement, said connected modulators producing output power having frequency components which include only one of said fundamental sideband frequencies.

15. Apparatus for converting polyphase power produced by an alternating current power source into power of a different frequency comprising in combination means for producing a plurality of wave trains of square wave pulses of different phase at a controlled frequency, said square wave producing means having separate outputs for wave trains of different phase; a plurality of switch modulators having an input circuit for connection to one phase output of the power source, an input circuit for connection to one phase output of said square wave producing means, and an output circuit; means connecting one input of each of said modulators to one output of said square wave producing means, each of said modulators producing output power at the fundamental sideband frequencies of the frequency of the power source; and means connecting the outputs of at least two of said modulators in a voltage summing arrangement, said connected modulators producing output power having frequency components which include only the lower sideband components of said fundamental sideband frequencies.

16. Apparatus for converting polyphase power produced by an alternating current power source having outputs which differ in phase by a predetermined electrical phase angle into power of a different frequency comprising in combination means for producing a plurality of wave trains of square wave pulses at a controlled frequency, each of said wave trains differing in phase from another of said wave trains by an amount equal to said predetermined electrical phase angle, said square wave producing means having an output for each of said wave trains of a different phase, a plurality of groups of switch modulators, each of said modulators in said groups having input and output circuits, means for respectively connecting each of said modulators of each of said groups to a respective one of the outputs of the power producing means, means connecting each of said modulators to one of said outputs of said square wave pulse producing means, each of said modulators of each of said groups producing output power at the fundamental sideband frequency of the frequency of the power source, and means connecting the outputs of the modulators of each of said groups in a voltage summing arrangement to produce output power having frequency components which include only the lower fundamental sideband frequency, the frequency of said lower sideband being desirably equal to said predetermined frequency, and the output power of said modulator groups differing in phase.

No references cited.